(12) United States Patent
von der Lippe et al.

(10) Patent No.: US 10,146,941 B2
(45) Date of Patent: Dec. 4, 2018

(54) PC PROTECTION BY MEANS OF BIOS/(U)EFI EXPANSIONS

(71) Applicant: WINCOR NIXDORF INTERNATIONAL GMBH, Paderborn (DE)

(72) Inventors: Carsten von der Lippe, Paderborn (DE); Volker Krummel, Paderborn (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 0 days.

(21) Appl. No.: 14/382,931

(22) PCT Filed: Feb. 14, 2013

(86) PCT No.: PCT/EP2013/052965
§ 371 (c)(1),
(2) Date: Sep. 4, 2014

(87) PCT Pub. No.: WO2013/131728
PCT Pub. Date: Sep. 12, 2013

(65) Prior Publication Data
US 2015/0047022 A1     Feb. 12, 2015

(30) Foreign Application Priority Data
Mar. 6, 2012     (DE) .................... 10 2012 101 876

(51) Int. Cl.
*G06F 21/34*     (2013.01)
*G06F 21/57*     (2013.01)
(Continued)

(52) U.S. Cl.
CPC ............ *G06F 21/572* (2013.01); *G06F 21/31* (2013.01); *G06F 21/34* (2013.01); *G06F 2221/2103* (2013.01); *H04L 63/0838* (2013.01)

(58) Field of Classification Search
CPC ......... H04L 9/00; H04L 63/0838; H04K 1/00; G06F 17/30; G06F 9/22; G06F 9/06;
(Continued)

(56) References Cited

U.S. PATENT DOCUMENTS 4,819,267 A     4/1989   Cargile et al.
5,060,263 A    10/1991   Bosen et al.
(Continued)

FOREIGN PATENT DOCUMENTS

| CN | 1010377803 A | 3/2009 | |
|---|---|---|---|
| EP | 2287733 | 2/2011 | |
| WO | WO 2013/048439 A1 * | 4/2013 | .............. G06F 9/22 |

OTHER PUBLICATIONS

Google Scholar search with Inventive concept: By reading a changing code on a first device, a second service device access the first device by generating access code by entering the first device's changing code in the second device. (Year: 1997).*

(Continued)

*Primary Examiner* — Ashokkumar B Patel
*Assistant Examiner* — Quazi Farooqui
(74) *Attorney, Agent, or Firm* — Black, McCuskey, Souers & Arbaugh, LPA (57) ABSTRACT

A method is provided for controlling access to the BIOS/(U)EFI or for controlling sub-functions of the BIOS of a self-service machine. The password of the BIOS is calculated via a deterministic algorithm incorporating code-generating information that changes over time. The method includes displaying code-generating information that changes over time on a screen of the self-service machine during access to the BIOS of the self-service machine. The method proceeds by inputting the code-generating information in a program on a second computer that also has the deterministic algorithm for calculating the password for the (Continued)

BIOS, and calculating and displaying the password on the second computer. The method then includes inputting the password on the self-service machine and checking the password by the deterministic algorithm to allow access to the BIOS if the password is correct.

24 Claims, 4 Drawing Sheets

(51) Int. Cl.
*G06F 21/31* (2013.01)
*H04L 29/06* (2006.01)

(58) Field of Classification Search
CPC ........ G06F 15/16; G06F 21/572; G06F 21/31; G06F 21/34; G06F 2221/2103
USPC ............... 726/1–33; 713/150–154, 160–168, 713/189–193; 380/28–30, 44–47, 380/255–286
See application file for complete search history.

(56) References Cited

U.S. PATENT DOCUMENTS

| | | | |
|---|---|---|---|
| 6,374,352 B1 | 4/2002 | Goldman et al. | |
| 6,633,981 B1 | 10/2003 | Davis | |
| 7,134,016 B1* | 11/2006 | Harris | G06F 21/121 713/168 |
| 2004/0111633 A1 | 6/2004 | Chang | |
| 2007/0022243 A1 | 1/2007 | Rudelic | |
| 2007/0135092 A1 | 6/2007 | Pieronek et al. | |
| 2007/0255934 A1 | 11/2007 | Dennis | |
| 2008/0034216 A1* | 2/2008 | Law | H04L 9/3273 713/183 |
| 2009/0094421 A1* | 4/2009 | Lewis | G06F 21/572 711/154 |
| 2009/0193215 A1 | 7/2009 | Rogers | |
| 2010/0088754 A1 | 4/2010 | Chislanzoni | |
| 2014/0230078 A1* | 8/2014 | Graham | G06F 21/572 726/30 |

OTHER PUBLICATIONS

Technical Details on Microsoft Product Activation for Windows XP dated Aug. 13, 2001.
International Search Report dated Feb. 14, 2013.
German Search Report dated Sep. 13, 2013.
International Search Report dated Sep. 26, 2013.
PCT/EP2013/052965—International Preliminary Report on Patentability—dated Sep. 9, 2014.
Chinese Office Action dated Apr. 13, 2017.

* cited by examiner

PC PROTECTION BY MEANS OF BIOS/(U)EFI EXPANSIONS

BACKGROUND

1. Field of the Invention

The invention relates to a method and a system for testing the system integrity of a self-service machine using a mobile terminal.

2. Description of the Related Art

The control of modern cash machines or self-service machines is carried out according to prior art using a customary PC running a standard operating system, e.g. Microsoft Windows XP. Other operating systems, such as Linux/Unix or other Windows versions, are of course conceivable. These standard components are primarily intended for a workstation and do not essentially meet the security requirements in the automated teller machine environment. In particular, malware can be installed on the control computer via known security vulnerabilities in order to ascertain customer data illegally. As new security vulnerabilities are continually being discovered in such operating systems, it is necessary to check the integrity of the software on the control computer.

For a holistic concept to defend against attacks on a self-service machine/ATM (automated teller machine), it is necessary that the PC is protected for a variety of scenarios.

Such attack scenarios on the PC may be divided into roughly three categories:

Category I: External attack without direct access to PC interfaces, e.g. via the Internet.

Category II: Attacks in which the attacker gains access to the interfaces (USB, network, power) of the PC, e.g. by breaking open the fascia.

Category III: Attacks in which the attacker gains complete control over the PC, i.e. can also perform any manipulations inside the PC housing.

The procedures described below are used primarily to protect against attacks of category II but are not limited thereto if, for example, preparations should be made for the other categories.

Examples of such attacks are:

Connection of a USB data storage device and booting of an independent operating system from it in order to pull off information from the system installation.

Connection of a USB data storage device and booting of an independent operating system from it in order to manipulate the peripherals from this PC, e.g. to pay out money from the separator without authorisation.

Connection of a USB data storage device and booting of an independent operating system from it in order to manipulate the installation on the system PC, e.g. to sneak in a code of its own which records PINs.

The use of existing barriers is not practicable in practice. For example, present-day PCs already have the ability via a BIOS setting to prohibit the possibility of booting from an external medium (an external medium in this case is understood to be any medium from which booting can be performed without the housing of the PC having to be opened, this also includes CDs in installed CD-ROM drives). This setting can be protected by means of a BIOS password so that unauthorised changes are prevented. Such a practice, however, is only feasible with individual passwords because if all the PCs in a bank are protected with the same password, which then has to be made known to a sizeable staff (service technicians, administrators), it can be assumed that this password will be generally known within a very short time.

With individual (but static) passwords per PC, it is necessary to clarify organisationally how the passwords are to be kept secret. Here there is a risk that the service technicians, for example, will store the passwords directly on the system (write them on the housing in felt tip so that they are immediately known at the next visit. If the individual passwords are managed in lists, again the risk very quickly arises that these lists will become known via the actual group of recipients who need them. In addition, these lists require regular maintenance.

Access to the BIOS must not be shut off completely as otherwise it is no longer possible to reconfigure the PC, e.g. after a disc failure.

The BIOS (basic input/output system) is the firmware in x86 PCs. It is stored in a non-volatile memory on the motherboard of a PC and is executed immediately after it is switched on. Among other things, the task of the BIOS is initially to make the PC operable and then to initiate the start-up of an operating system. It should be noted that there may be alternative forms of a BIOS, such as BIOS/(U)EFI, which also fall within the scope of the application.

In current language, the expression BIOS is sometimes also used now to mean BIOS settings.

SUMMARY OF THE INVENTION

The BIOS/(U)EFI software of the PCs used in self-service machines/ATMs will be expanded so that in addition to the existing functionality of a static password there will also be the possibility of protection via a one-time password (OTP). With the help of this mechanism, the BIOS settings which, for example, control the boot sequence, can be protected so that these settings are only available if the OTP has been entered correctly.

In detail, it is a method for controlling access to the BIOS or for controlling sub-functions of the BIOS of a self-service machine, the password of the BIOS being calculated via a deterministic algorithm incorporating code-generating information that changes over time. This algorithm is, for example, a deterministic/cryptographic random number generator. On entering a so-called "seed", it generates pseudo random numbers and is therefore usually called a pseudo random number generator (PRNG). It generates a sequence of numbers which although it appears random actually is not since it is calculated by a deterministic algorithm. It is considerably easier for computers to generate such pseudo random numbers than real random numbers and they are available nowadays in a variety of forms (In this case, for example, the current time can be selected as the input value).

Every time the random calculation is launched with the same start value, the so-called seed, the same pseudo random number sequence is generated which is why these deterministically generated pseudo random numbers can be reproduced at a later date with sufficient knowledge of the seeds.

These seeds incorporate, for example, the system time or counter which change over time. It may also be a case of memory areas that are subject to constant change. It is important in this case that the seed is sufficiently complex or contains sufficient entropy to prevent a brute-force attack.

The method comprises the following steps:

Display of the code-generating information that changes over time on a screen of the self-service machine during access to the BIOS of said self-service machine. If the user wants to get into the BIOS by pressing a function key during boot-up, the code-generating information that is incorporated in the algorithm for generating the password is displayed. In relation to the deterministic algorithm as has been described above, the code-generating information is the input parameter for the random number function.

The code-generating information is entered in a program on a second computer, which also has the deterministic algorithm for calculating the password for the BIOS, in order to thus calculate the password on the second computer.

After entering the password on the self-service machine, the password is checked by the deterministic algorithm in order to allow access to the BIOS if the password is correct.

The code-generating information is preferably a combination of characters/numbers which is made up of one or more of the following components: the serial number ID of the self-service machine, the time, the date, hardware features of the self-service machine.

The program for creating the password is stored on the second computer on a Crypto Stick, also known as a CrypTA Stick, which encrypts and stores the program. Such a Crypto Stick generally has a crypto processor which encrypts data and saves it to a memory area if necessary. Authentication is required to get at these data. After authentication, the program or the data that are in the memory area are decrypted and it becomes possible to access the data. Thus, for example, the program can also be encrypted in certain areas after loading in the memory and the program decrypts itself with the help of the crypto processor which is present on the Crypto Stick during the execution process itself. This makes it more difficult for a memory area to be read during execution in order to decrypt the algorithm. It is also conceivable that checking with a debugger will be deactivated and that it will be detected if a virtualisation is used that makes it easier to read memory areas. If a virtualisation is detected, then the program launch, for example, can be stopped.

The term Crypto Stick is not to be understood as limiting. The term can also include dongle that have no writable memory at all but merely permit a logic sequence.

This ensures that the program on the second computer can only be run if the Crypto Stick is connected to the second computer so that the program can decrypt itself. This therefore makes it more difficult to use the program separately.

Additionally, in a preferred embodiment, during generation of the password, an asymmetrical encryption process or signature process can be used, the self-service machine having access to the public key with which the password can be verified, the secret key being located on the secure Crypto Stick to which the program has access. It is therefore possible to check a signature and make sure that there is no misuse.

The access control can basically control the entire BIOS or access to the BIOS functions or also sub-functions thereof. Thus, for example, it is possible to request a password for changing the type of password access to the BIOS/(U)EFI settings.

Or a password can also be requested for modifying the boot sequence or generally enabling the booting of external storage media. It is also conceivable if a hard drive is replaced that the BIOS data must be checked and adapted which is then controlled by a password.

The password in this case contains information about the identity of the program or its user. Thus, for example, it is possible to determine the user identify and the identity of the program based on the Crypto Stick and to display them by means of an appropriate signature such that this additional information is attached to the password to enable the self-service machine to then store these data separately. As a result of this, it is conceivable to set up a corresponding access protocol.

The protocol can include the date/time and the password, it being possible to reconstruct this information in the event of a problem, preferably so that it is also possible to retrieve it via another program that runs on the installed operating system of the self-service machine. This program that runs on the operating system of the self-service machine can usually be queried remotely from a central server so that it is not necessary to send a service engineer to the machine.

It is clear that it is not absolutely necessary for the program to be executed locally on a computer that stands spatially in front of the ATM. Thus, after transmission of the information necessary for generating the password to a central office, this central office can generate the password. Conceivable solutions are that the service engineer logs in on a remote server which provides access to the program and the Crypto Stick. This login is therefore personalised which enables the identity to be ascertained. Alternatively, of course, it is possible to phone a control centre to convey the data necessary for generating a password to a person. The person then tells the service engineer the password with which the service engineer can log on.

In a further embodiment, after successfully modifying the BIOS settings and starting up the computer with the new BIOS settings, the BIOS settings are automatically reset to default values during the next boot-up or after a defined minimum time span t (time period). These default values specify, for example, the boot sequence. By using this approach, it is possible to prevent these BIOS settings from being stored permanently after they have been modified and to prevent any misuse from being enabled in the future because the service engineer has forgotten to reset them to their original state.

In another embodiment, the BIOS can reset the boot settings or the password protection to the default settings on every boot-up.

It is also conceivable that the password is only valid for a defined period and/or for a certain number of boot-ups, for example, a few hours or a day and/or one boot-up.

Another part of the invention is a self-service machine which has a BIOS that implements the process referred to above.

The self-service machine is provided with a BIOS that is provided with password protection to enable control of access to the BIOS or control of sub-functions of the BIOS, the password of the BIOS being calculated via a deterministic algorithm which incorporates code-generating information that changes over time.

The self-service machine has a display on which code-generating information that changes over time is displayed during access to the BIOS, said information being incorporated in calculation of the password. The service engineer therefore has the option to read this information. It may also be sufficient in a special embodiment for a serial number and a time period to be incorporated in the calculation. E.g. serial number xyz and date 24.12.2011. If the time and date of the self-service machine are synchronised, it is possible to perform an appropriate calculation without it being necessary to display information. In this case, the password would be valid for a day.

Moreover, the self-service machine comprises input means which permit input of the password, wherein the password which has been calculated on a second computer using the code-generating information is checked by incorporating the displayed code-generating information in a deterministic algorithm so that a password which changes over time is valid.

DETAILED DESCRIPTION

Figure 1:
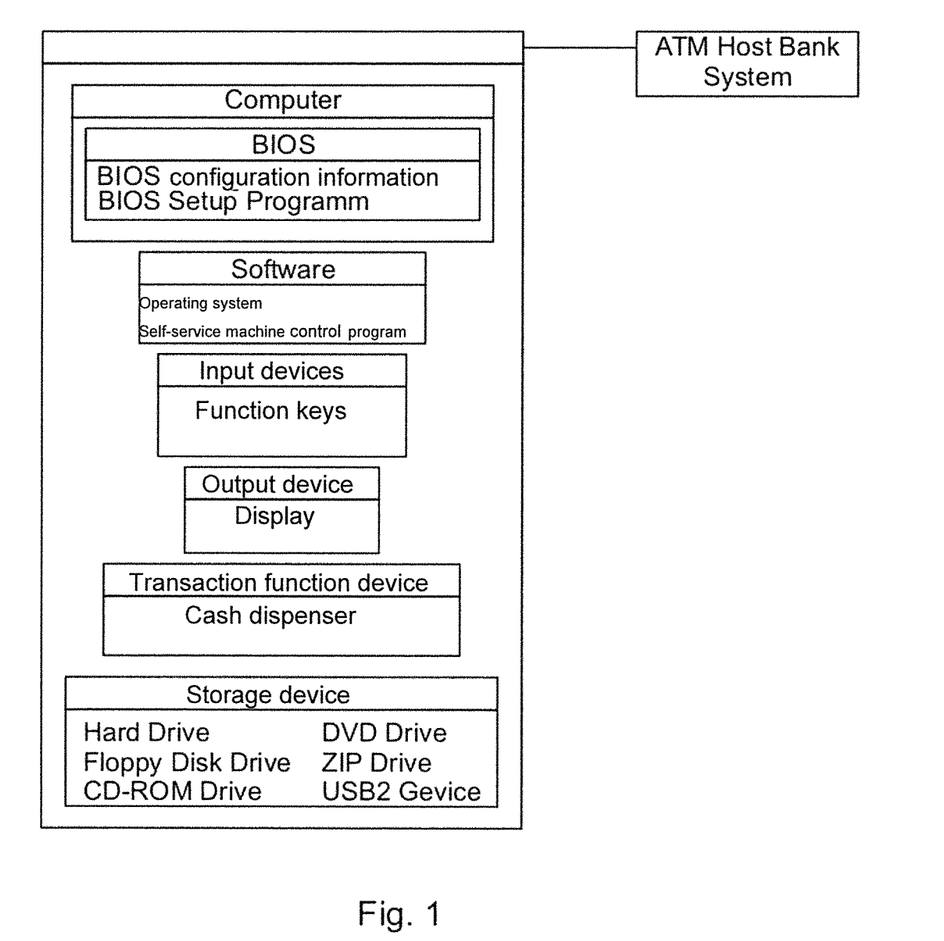
FIG. 1 shows the schematic construction of a self-service machine (ATM).
Figure 2:
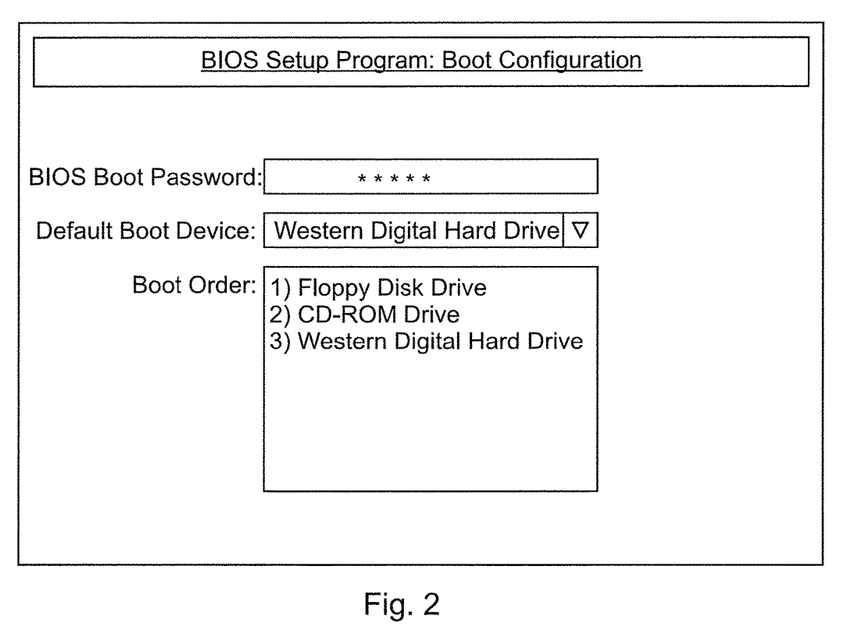
FIG. 2 shows the access and a sub-function of the BIOS.
Figure 3A:
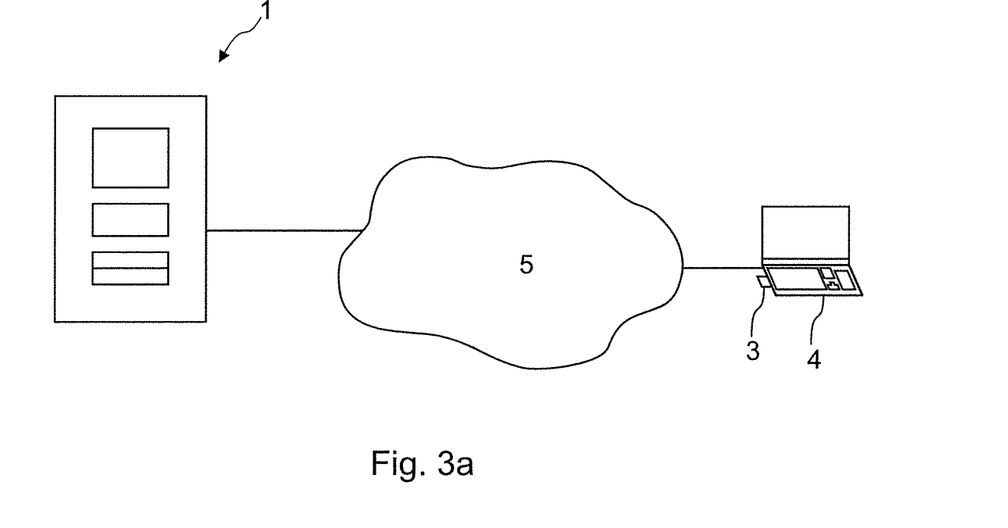
FIG. 3a shows the creation of a password remote from a self-service machine.
Figure 3B:
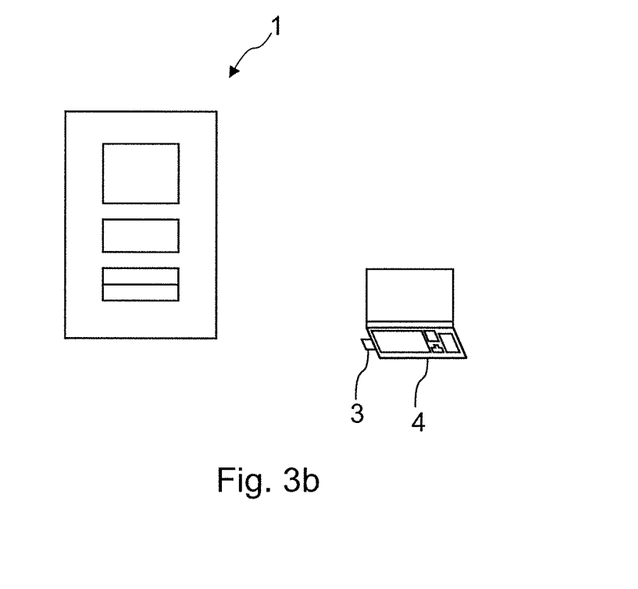
FIG. 3b shows the creation of a password in the vicinity of the self-service machine.

FIG. 1 shows the basic construction of a self-service machine which in the present case is a cash machine (ATM).
The automated machine comprises a computer which in turn has a BIOS. The BIOS comprises configuration information and a BIOS set-up program. Software, comprising an operating system and on it a specific self-service machine check program which provides the automated machine's functionality, runs on the computer. The automated machine is provided with input devices such as keyboards and card readers and has a display and a printer. Furthermore, functional devices for transactions are present, such as a cash dispenser and a cash receipt unit. The self-service machine further comprises hard disks, floppy drives, CD ROM drives, DVD drives, USB ports, etc. Furthermore, the self-service machine is usually connected via a network to a host bank system which controls and monitors the automated machine.
FIG. 2 shows a screen printout of a BIOS set-up program which controls the boot configuration. Here the sequence of the boot devices is specified. First of all, booting takes place from the floppy drive, then from a CD ROM drive and finally via a hard drive. This area is protected by a password in the present embodiment.
Here it depends on the individual protection requirements whether the OTP (one-time password) will protect one or more of the following settings of the BIOS/(U)EFI:
Access to the BIOS/(U)EFI settings
Modification of the type of password access to the BIOS/(U)EFI settings
Modification of the boot sequence or generally enabling the booting of external storage media.
If a service technician then wants to modify the BIOS settings, e.g. in order to re-install an operating system, he presses the appropriate keyboard combination during the PC start-up to get into the BIOS settings. He will then be asked to enter the OTP. For this he is shown a combination of characters/numbers on a screen which consists of the serial number/UID, the time/date and if necessary other hardware features of the PC.
He enters this combination of characters/numbers in a further/second program (hereafter referred to as the OTP generator) which runs, for example, on his notebook/PDA/mobile phone.
FIG. 3b shows a situation in which a laptop 2 is provided with a Crypto Stick, the ATM 1 displaying the data on its display unit. FIG. 3a shows a remote situation.

Figure 4:
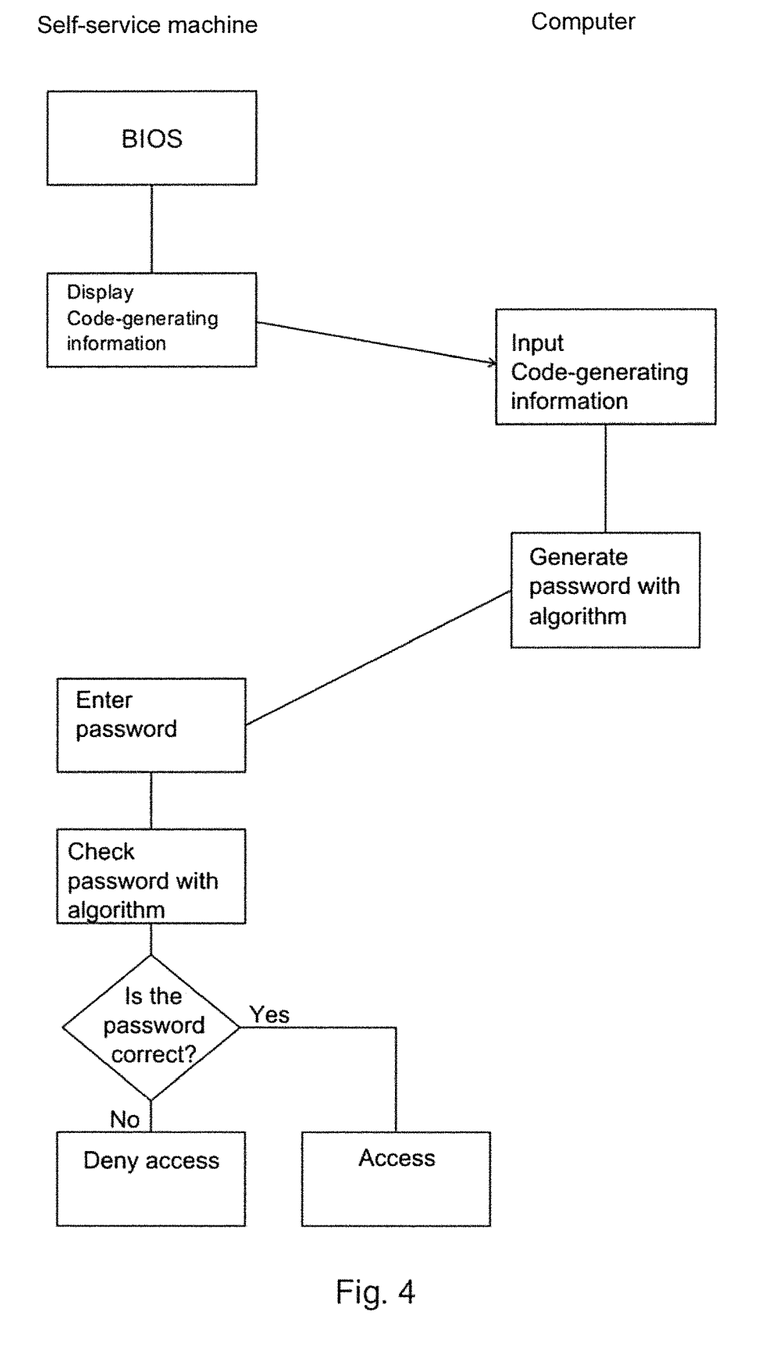
FIG. 4 shows the sequence of the process on the self-service machine and a computer.

The OTP generator calculates the currently valid OTP based on the combination of characters/numbers according to a secret algorithm, as has been described above in the basic principles. The technician transfers the OTP to the locked computer. As a result, the computer is unlocked and the technician can carry out his modifications.
The OTP generator/algorithm/program is protected against reverse engineering in that the program is encrypted and is only partially decrypted during execution.
A preferred implementation therefore consists of a CrypTA (Crypto Stick)-protected program as the distribution and usability of the OTP generator can be controlled in this way. Execution is only possible with the Crypto Stick. Furthermore, the stick is configured such that its validity is limited to 3 months. After this, the validity must be extended via a central office. This can be controlled by means of appropriate certificates or timers within the Crypto processor. The keys are on the Crypto Stick.
Asymmetrical procedures should preferably be used for implementation. The ATM has a public key with which the OTP can be verified. The secret key is therefore only located in the specially CrypTA-protected program and not in the potentially attacked ATM.
To prevent further misuse, the OTP contains information about the identity of the OTP generator copy or its user. For example, this may be the ID of the CrypTA Stick. The OTP, or a selection of the information contained therein, is persistently saved by the BIOS with the time/date of entering the OTP as a list of the last n unlocking processes (n is a natural number). As a result, it is possible in the event of a problem to reconstruct who has tampered with the PC. It is preferably also possible to query this information via a program that runs on the installed operating system.
The description above also does not conflict with remote use of this principle where the person requests the OTP on site via telephone or the Internet from a call centre or other central infrastructure. In this case, however, authentication of the requester should take place. FIG. 3b shows a corresponding illustration.
The time/date details in the combination of characters/numbers are used due to the fact that the OTPs are each only valid for a defined time period, for example a few hours or a day. This stops it from being possible to use the OTP again later to bypass the boot protection, for example by a different person who has caught sight of this OTP.
In an embodiment with enhanced security technology, the BIOS/(U)EFI automatically resets modified boot settings for the next boot-up or after a defined minimum time span. This guards against the case where a technician forgets to reset the settings to the normal values again after his service assignment.
An alternative to this is for the boot settings and/or the password protection to be reset as standard on every boot-up by the software that is installed on the hard drive in the PC. This is particularly interesting when the technician generally eliminates the necessity for a password after entering the OTP.
FIG. 4 shows the method as it is executed on the self-service machine and the computer. A BIOS call is made on the self-service machine. This displays the code-generating information. This information is entered on a computer which calculates the password with the help of the Crypto Stick and the algorithm. The password is then entered in the self-service machine. A check is carried out on the self-service machine. If the password is valid, access is granted otherwise access is denied.

The invention claimed is:

1. A method for controlling access to a BIOS/(U)EFI of a self-service machine, the method comprising the steps:
 calculating a one-time password of the BIOS/(U)EFI via a deterministic algorithm on the self-service machine, wherein code-generating information that changes over time is incorporated in the deterministic algorithm;
 during a process to control access to the BIOS/(U)EFI of the self-service machine, displaying, on a screen of the self-service machine, the code-generating information that changes over time;
 inputting the code-generating information in a program on a second computer, which also has the deterministic algorithm, the deterministic algorithm of the second computer configured for calculating the one-time password for the BIOS/(U)EFI;
 displaying the one-time password calculated by the deterministic algorithm of the second computer on a screen of the second computer;
 inputting on the self-service machine the one-time password displayed on the screen of the second computer; and
 checking the one-time password by the deterministic algorithm of the self-service machine in order to allow access to the BIOS/(U)EFI of the self-service machine if the one-time password is correct.

2. The method according to the claim 1, wherein the code-generating information is a combination of characters/numbers that comprise at least one of: a serial number ID of the self-service machine, a time, a date, and hardware features of the self-service machine.

3. The method according to claim 1, wherein the program on the second computer is stored on a Crypto Stick or a hardware dongle that encrypts and stores the program.

4. The method according to claim 3, wherein the program on the second computer can only be run if the Crypto Stick or the hardware dongle is connected to the second computer so that the program can decrypt itself.

5. The method according to claim 3, further comprising:
 during calculation of the one-time password on the second computer, using an asymmetrical encryption process or signature process; and
 gaining access by the self-service machine to a public key with which the one-time password can be verified, the public key being located on the Crypto Stick or the hardware dongle to which the program has access.

6. The method according to claim 4, wherein the program is encrypted and decrypts itself in parts or completely when it has access to the Crypto Stick or the hardware dongle.

7. The method according to claim 1, wherein the one-time password enables:
 access to settings of the BIOS/(U)EFI;
 modification of a type of one-time password access to the BIOS/(U)EFI settings; and
 modification of a boot sequence or enabling booting of external storage media.

8. The method according to claim 1, wherein the one-time password contains information about an identity of the program or its user.

9. The method according to 8, further comprising storing an access protocol on the self-service machine, the access protocol configured to reconstruct information regarding the time, date, and one-time password, in the event of a problem, thereby enabling retrieval of the information via another program that runs on the installed operating system of the self-service machine.

10. The method according to claim 1, wherein the one-time password is retrieved via telephone or Internet by a call center or other central infrastructure.

11. The method according to claim 1, further comprising the step of automatically resetting the BIOS/(U)EFI settings to modified boot settings for the next boot-up or after a defined minimum time span.

12. The method according to claim 1, wherein the BIOS generally carries out a reset of boot settings and/or password protection to the default settings on every boot-up.

13. The method according to claim 1, wherein the one-time password is only valid for a defined period and/or for a certain number of boot-ups.

14. A system comprising;
 a BIOS of a self-service machine, the BIOS provided with password protection to enable control of access to the BIOS or control of sub-functions of the BIOS, wherein a one-time password of the BIOS is calculated via a deterministic algorithm that incorporates code-generating information that changes over time,
 a display of the self-service machine, the display configured to display thereon code-generating information that changes over time during a process to control access to the BIOS;
 a second computer having a second computer input for inputting the code-generating information displayed on the display of the self-service machine, the second computer also having the deterministic algorithm for calculating the one-time password from the code-generating information, and the second computer also having a display for displaying the one-time password calculated by the deterministic algorithm of the second computer;
 input means on the self-service machine that permit input of the one-time password that has been calculated by the second computer using the code-generating information;
 wherein the deterministic algorithm of the self-service machine is configured to check the one-time password by incorporating the displayed code-generating information in the deterministic algorithm of the self-service machine to determine if the one-time password that changes over time is valid.

15. The system according to claim 14, wherein the code-generating information is a combination of characters/numbers that comprise at least one of: a serial number ID of the self-service machine, a time, a date, or hardware features of the self-service machine.

16. The system according to claim 14, wherein additionally the one-time password has been signed by a private key, the self-service machine having access to a public key with which the one-time password can be verified.

17. The system according to claim 14, wherein the following functions are enabled by the one-time password:
 access to the BIOS settings;
 modification of a type of password access to the BIOS settings; and
 modification of a boot sequence or enabling booting of external storage media.

18. The system according to claim 14, wherein the one-time password contains information about the identity of the program that has calculated the one-time password and/or its user.

19. The system according to claim 18, further having a memory area in which a protocol for inputting the one-time password is stored on the self-service machine, the protocol comprising information regarding time/date and the one-time password, it being possible to reconstruct this information in the event of a problem so that it is also possible to retrieve it via another program that runs on the installed operating system of the self-service machine.

20. The system according to claim 14, wherein the one-time password can be retrieved via telephone or Internet by a call ,center or other central infrastructure, or can be calculated by a program on another computer.

21. The system according to claim 14, wherein the BIOS automatically resets modified boot settings for a next boot-up or after a defined minimum time span.

22. The system according to claim 14, further comprising means for using the BIOS to reset boot settings and/or password protection to default settings on every boot-up.

23. The system according to claim 14, further comprising means for invalidating the one-time password after a defined period and/or after a certain number of boot-ups.

24. A method for controlling access to a BIOS/(U)EFI of an automated teller machine, the method comprising the steps:
- calculating a one-time password of the BIOS/(U)EFI via a deterministic algorithm on the self-service machine, wherein code-generating information that changes over time is incorporated in the deterministic algorithm;
- during a process to control access to the BIOS/(U)EFI of the self-service machine, displaying, on a screen of the automated teller machine, the code-generating information that changes over time;
- inputting the code-generating information in a program on a second computer, where the second computer is a mobile electronic device located proximate the self-service machine, which also has the deterministic algorithm, the deterministic algorithm of the second computer configured for calculating the one-time password for the BIOS/(U)EFI;
- displaying the one-time password calculated by the deterministic algorithm of the second computer on a screen of the second computer;
- inputting on the automated teller machine the one-time password displayed on the screen of the second computer; and
- checking the one-time password by the deterministic algorithm of the automated teller machine in order to allow access to the BIOS/(U)EFI of the automated teller machine if the one-time password is correct.

\* \* \* \* \*